United States Patent
Juliato et al.

(10) Patent No.: US 10,355,891 B2
(45) Date of Patent: Jul. 16, 2019

(54) AUTHENTICATION THROUGH VOLTAGE VARIATIONS OVER COMMUNICATION CHANNELS

(71) Applicant: Intel Corporation, Santa Clara, CA (US)

(72) Inventors: Marcio Juliato, Portland, OR (US); Li Zhao, Beaverton, OR (US); Ahmed Shabbir, Beaverton, OR (US); Manoj R. Sastry, Portland, OR (US); Santosh Ghosh, Hillsboro, OR (US); Rafael Misoczki, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/720,389

(22) Filed: Sep. 29, 2017

(65) Prior Publication Data

US 2019/0104001 A1   Apr. 4, 2019

(51) Int. Cl.
*H04L 12/40* (2006.01)
*H04L 25/49* (2006.01)

(52) U.S. Cl.
CPC .......... *H04L 25/4917* (2013.01); *H04L 12/40* (2013.01); *H04L 2012/40215* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,904,494 | B2* | 3/2011 | Cho ........................ | G06F 7/588 708/250 |
| 9,374,746 | B1* | 6/2016 | Karabinis ............ | H04B 17/102 |
| 2005/0289408 | A1* | 12/2005 | Jani ...................... | G01R 31/024 714/712 |
| 2008/0044011 | A1* | 2/2008 | Yoshida ................ | H04L 1/0045 380/28 |
| 2008/0051117 | A1* | 2/2008 | Khare ..................... | G06F 21/35 455/458 |
| 2011/0158108 | A1* | 6/2011 | Chan ...................... | H04L 43/50 370/250 |

(Continued)

OTHER PUBLICATIONS

Kyong-Tak Cho et al., "Security System for Electronic Equipment", U.S. Appl. No. 15/450,650, filed Mar. 6, 2017, 40 pages.

*Primary Examiner* — Linda Wong
(74) *Attorney, Agent, or Firm* — Schwabe, Williamson & Wyatt, P.C.

(57) ABSTRACT

Embodiments may include systems and methods for authenticating a message between a transmitter and a receiver. An apparatus for communication may include a transmitter to transmit a message to a receiver via a physical channel coupling the transmitter and the receiver. The message may be transmitted via a plurality of transmission voltage levels varied from a plurality of nominal voltage levels on the physical channel. The transmitter may include a voltage generator to generate the plurality of transmission voltage levels varied in accordance with a sequence of voltage variations from the plurality of nominal voltage levels for the message. The sequence of voltage variations may serve to authenticate the message between the transmitter and the receiver. Other embodiments may be described and/or claimed.

25 Claims, 8 Drawing Sheets

(56) References Cited

U.S. PATENT DOCUMENTS

| | | | |
|---|---|---|---|
| 2013/0077565 A1* | 3/2013 | Jacobs | H04W 74/0825 370/328 |
| 2013/0103942 A1* | 4/2013 | Sullivan | H04L 9/0662 713/168 |
| 2013/0272518 A1* | 10/2013 | Wu | H04L 9/0861 380/44 |
| 2016/0149601 A1* | 5/2016 | Lin | H02J 50/20 307/104 |
| 2017/0264253 A1* | 9/2017 | Gorbachov | H03F 1/0266 |
| 2018/0123516 A1* | 5/2018 | Kim | H03F 1/02 |
| 2018/0127001 A1* | 5/2018 | Ricci | B60R 25/2018 |

* cited by examiner

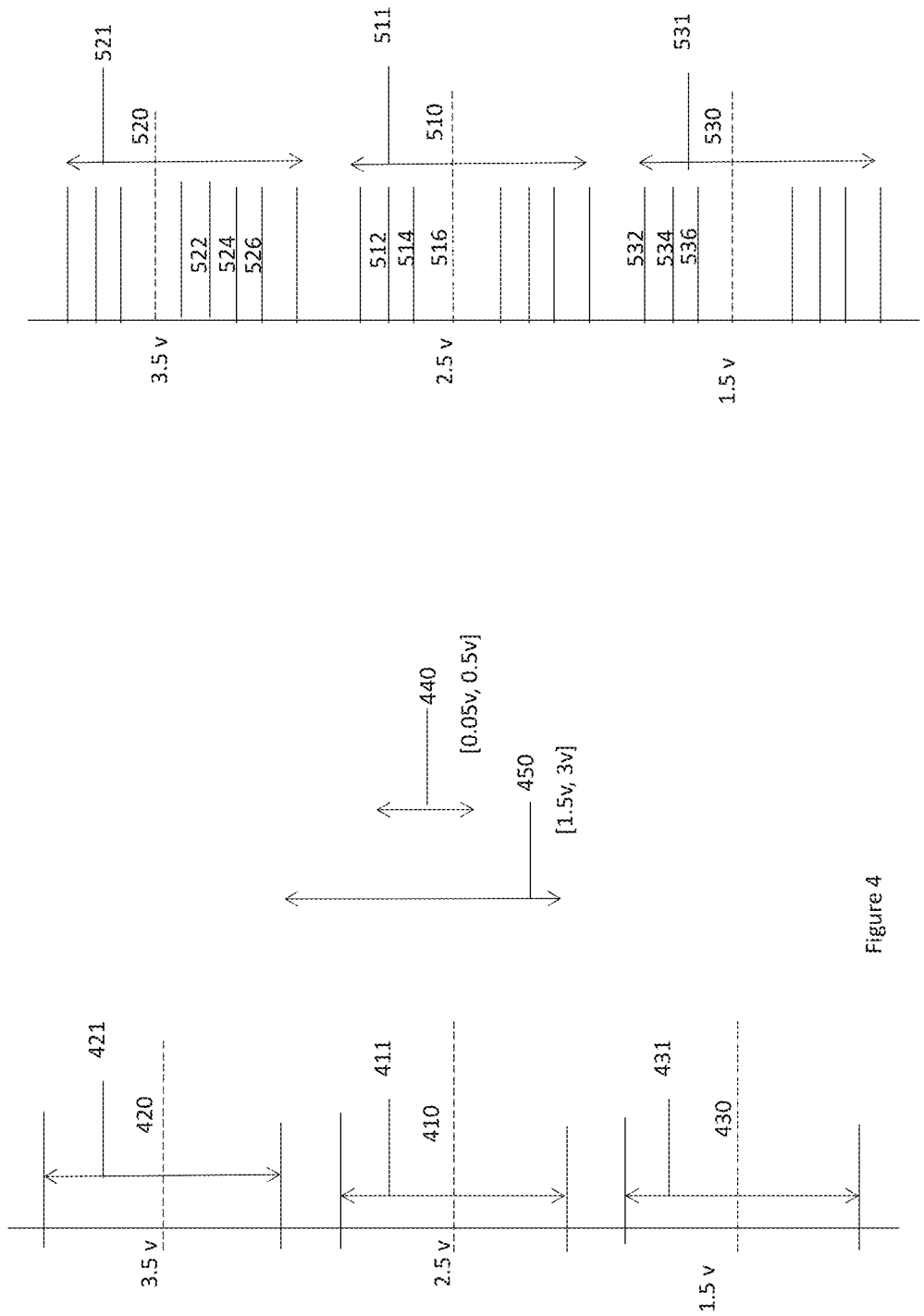

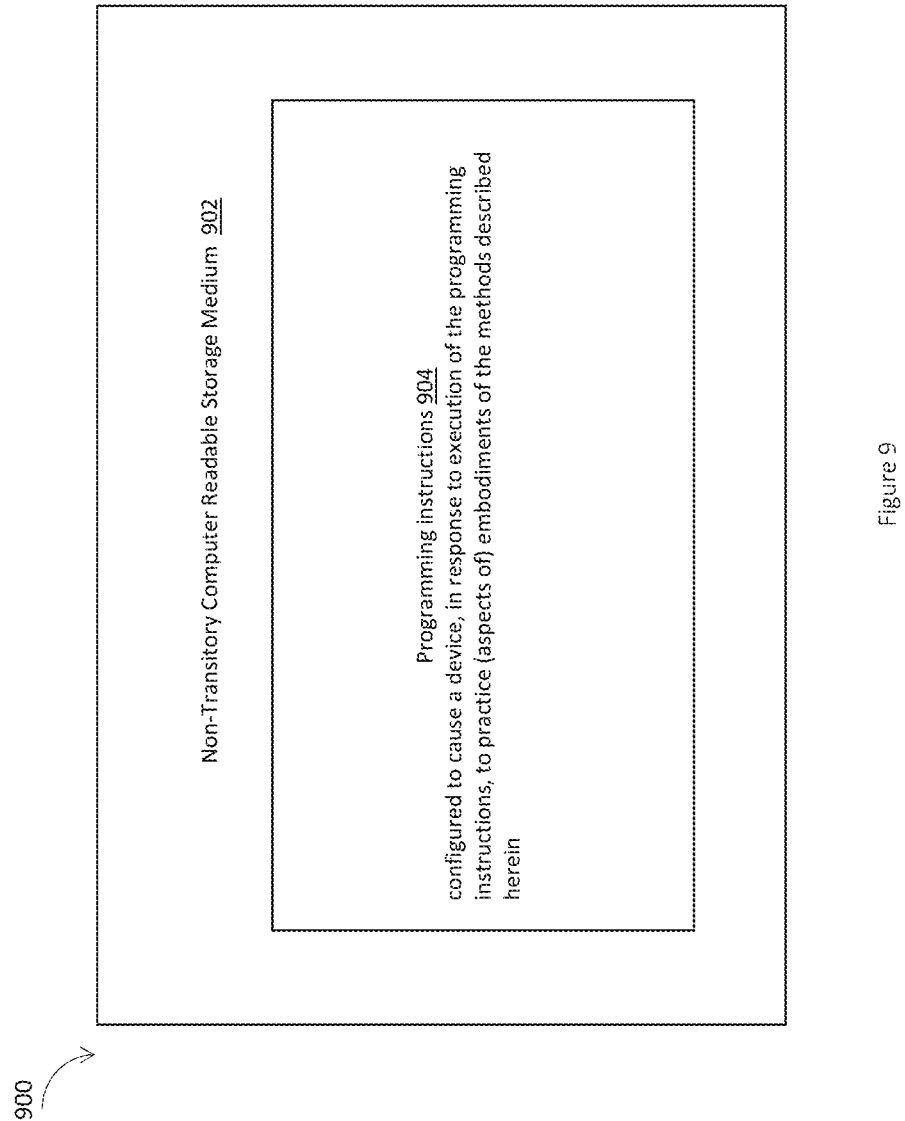

AUTHENTICATION THROUGH VOLTAGE VARIATIONS OVER COMMUNICATION CHANNELS

FIELD

Embodiments herein relate generally to the technical field of computing and communication, and more particularly to authentication of communications between transmitter and receiver devices over a physical channel.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Computer security, also known as cyber security, communication security, information security, may refer to the protection of computer systems including the hardware, software, or information, from disruption or misdirection of the services they provide. The computer security field is of growing importance due to the increasing reliance on computer systems and the Internet, wireless networks, and the growth of "smart" devices, including devices within transportation vehicles, smartphones, televisions, tiny devices as part of the Internet of Things, and many more other devices.

A vehicle may include many mechanical and electronic subsystems, e.g., embedded electronics. Electronic control units (ECUs) may be used in vehicles to achieve more flexibility, e.g., to perform upgrades, adjustments, and customizations, as well as to deliver more complex features, e.g. advanced driving assistance. Multiple ECUs may communicate through in-vehicle networks, e.g., controller area network (CAN) buses. Communication buses such as CAN buses may utilize broadcast protocols without much security. Traditional cryptographic techniques may not be directly applicable to communication buses like CAN buses to provide improved information security. For instance, there may be no existing way of authenticating an entity that sends messages over a bus like a CAN bus. Without the authentication, communications on a bus like a CAN bus may be subject to security attacks, e.g., message spoofing. Hence, protection of buses like CAN buses may be desired to ensure proper security of the in-vehicle network and consequently the safety of its passengers.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 4 illustrates examples of transmission voltage levels selected from a set of varied voltage levels varied from nominal voltage levels on a physical channel, in accordance with various embodiments.

FIG. 5 illustrates further examples of transmission voltage levels selected from a set of varied voltage levels varied from nominal voltage levels on a physical channel, in accordance with various embodiments.

FIG. 9 illustrates a storage medium having instructions for practicing methods described with references to FIGS. 1-8, in accordance with various embodiments.

DETAILED DESCRIPTION

Figure 1:
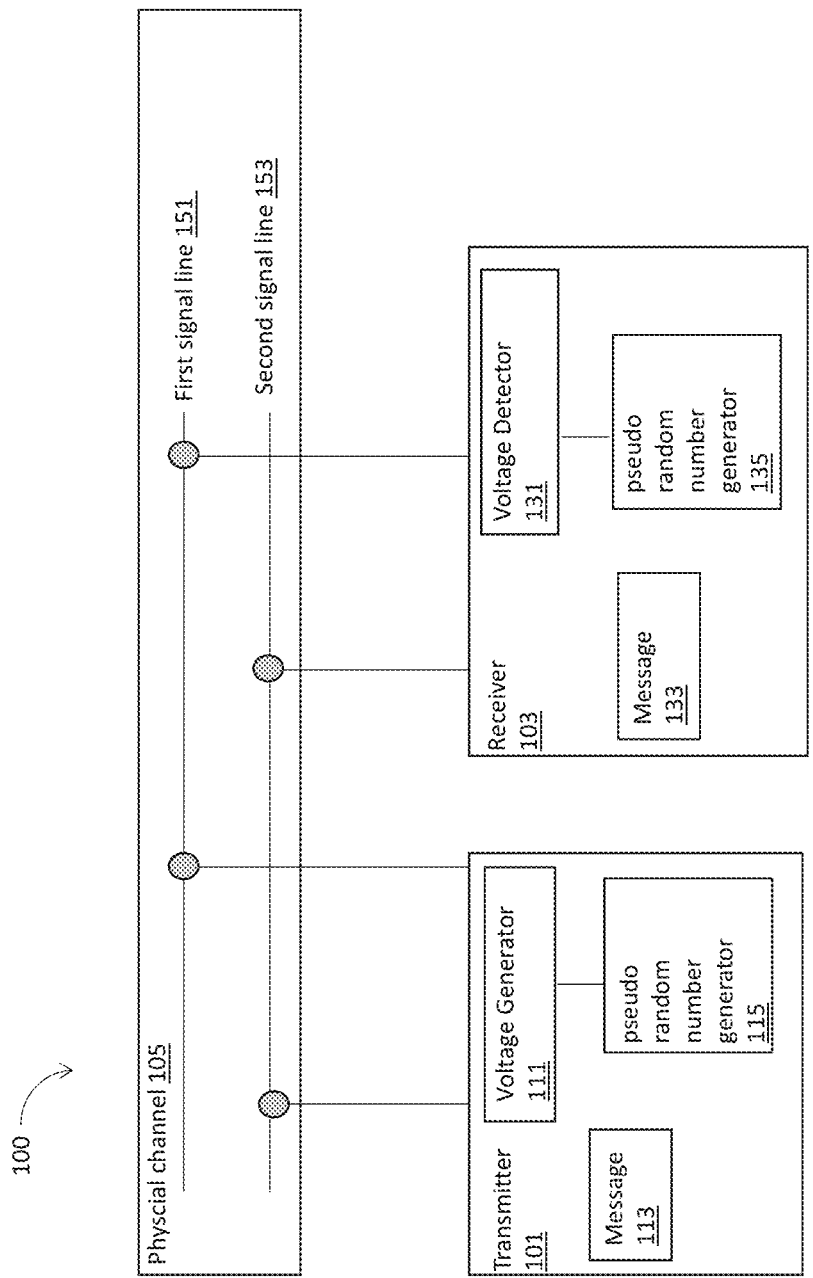
FIG. 1 illustrates an example communication system including a transmitter and a receiver coupled by a physical channel, where a message may be transmitted via a plurality of transmission voltage levels varied from a plurality of nominal voltage levels on the physical channel, in accordance with various embodiments.

A digital message, or simply a message, may be transmitted over a physical channel by analog signals such as voltages, currents, or other signals. When voltages may be used to transmit a message, one nominal voltage level, e.g., 3.5 voltage (v), may be used to represent a digital 1 of the message, while another nominal voltage level, e.g., 0 v, may be used to represent a digit 0 of the message. Sometimes, a physical channel may include two signal lines, and a differential voltage, e.g., a voltage difference between a voltage level for a first signal line and a voltage level for a second signal line, may be used to represent a digital 1 or a digital 0 of a message. For example, a controller area network (CAN) bus may include two signal lines. A digital 0 may be represented as a dominant signal, where a first signal line would have a nominal voltage level 3.5 v and a second signal line would have a nominal voltage level 1.5 v. On the other hand, a digital 1 may be represented as a recessive signal, where a first signal line and a second signal line would both have a nominal voltage level 2.5 v.

In embodiments, instead of having a first nominal voltage level for a first signal line and a second nominal voltage level for a second signal line to represent a digital 0 or a digital 1, multiple voltage levels, referred to as transmission voltage levels, for a first signal line and a second signal line, may be used to represent a digital 0 or a digital 1. For example, when a first signal line may have a nominal voltage level 3.5 v and a second signal line may have a nominal voltage level 1.5 v to represent a digital 0, a transmission voltage level of 3.75 v for the first signal line and a transmission voltage level of 1.05 v for the second signal line may also be used to represent a digital 0. In general, multiple transmission voltage levels varied from a plurality of nominal voltage levels on a physical channel may be used to transmit a digital 0 or a digital 1, where a transmission voltage level may have a voltage variation from a nominal voltage level of the physical channel. In embodiments, the voltage variations and hence the transmission voltage levels, may be used to authenticate a message from a transmitter to a receiver. For improved security, the voltage variations may be determined based at least in part on a deterministic pseudo-random bit stream generated by a pseudo-random number generator.

In embodiments, an apparatus for communication may include a transmitter to transmit a message to a receiver via a physical channel coupling the transmitter and the receiver. The message may be transmitted via a plurality of transmission voltage levels varied from a plurality of nominal voltage levels on the physical channel. In detail, the transmitter may include a voltage generator to generate the plurality of transmission voltage levels varied in accordance with a sequence of voltage variations from the plurality of nominal voltage levels for the message. The sequence of voltage variations may serve to authenticate the message between the transmitter and the receiver.

In embodiments, an apparatus for communication may include means for receiving a message from a transmitter via a physical channel coupling the transmitter and the apparatus. The message may be received via a plurality of transmission voltage levels varied from a plurality of nominal voltage levels on the physical channel. The apparatus may further include means for determining the plurality of transmission voltage levels received varied in accordance with a sequence of voltage variations from the plurality of nominal voltage levels possible for the message. The sequence of voltage variations may serve to authenticate the message between the transmitter and the receiver.

In embodiments, a method for authenticating a message between a transmitter and a receiver may include: generating a plurality of transmission voltage levels for a message to be transmitted on a physical channel coupling the transmitter and the receiver. The plurality of transmission voltage levels may include voltage levels varying in accordance with a sequence of voltage variations from a plurality of nominal voltage levels. The sequence of voltage variations may serve to authenticate the message between the transmitter and the receiver. The method may further include transmitting the plurality of transmission voltage levels over the physical channel from the transmitter to the receiver.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A or B" and "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used hereinafter, including the claims, the term "module" or "routine" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, programmable hardware (e.g. FPGAs), and/or other suitable components that provide the described functionality.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

The terms "coupled with" and "coupled to" and the like may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. By way of example and not limitation, "coupled" may mean two or more elements or devices are coupled by electrical connections on a printed circuit board such as a motherboard, for example. By way of example and not limitation, "coupled" may mean two or more elements/devices cooperate and/or interact through one or more network linkages such as wired and/or wireless networks. By way of example and not limitation, a computing apparatus may include two or more computing devices "coupled" on a motherboard or by one or more network linkages.

As used herein, the term "circuitry" refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD), (for example, a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

As used herein, the term "processor circuitry," or simply "processor," may refer to, is part of, or includes circuitry capable of sequentially and automatically carrying out a sequence of arithmetic or logical operations; recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes.

As used herein, the term "interface circuitry" may refer to, is part of, or includes circuitry providing for the exchange of information between two or more components or devices. The term "interface circuitry" may refer to one or more hardware interfaces (for example, buses, input/output (I/O) interfaces, peripheral component interfaces, network interface cards, and/or the like).

As used herein, the term "computer device" may describe any physical hardware device capable of sequentially and automatically carrying out a sequence of arithmetic or logical operations, equipped to record/store data on a machine readable medium, and transmit and receive data from one or more other devices in a communications network. A computer device may be considered synonymous to, and may hereafter be occasionally referred to, as a computer, computing platform, computing device, etc. The term "computer system" may include any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources. Examples of "computer devices", "computer systems", etc. may include cellular phones or smart phones, feature phones, tablet personal computers, wearable computing devices, an autonomous sensors, laptop computers, desktop personal computers, video game consoles, digital media players, handheld messaging devices, personal data assistants, an electronic book readers, augmented reality devices, server computer devices (e.g., stand-alone, rack-mounted, blade, etc.), cloud computing services/systems, network elements, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or any other like electronic devices. Moreover, the term "vehicle-embedded computer device" may refer to any computer device and/or computer system physically mounted on, built in, or otherwise embedded in a vehicle.

As used herein, the term "network element" may be considered synonymous to and/or referred to as a networked computer, networking hardware, network equipment, router, switch, hub, bridge, radio network controller, radio access network device, gateway, server, and/or any other like device. The term "network element" may describe a physical computing device of a wired or wireless communication network and be configured to host a virtual machine. Furthermore, the term "network element" may describe equipment that provides radio baseband functions for data and/or voice connectivity between a network and one or more users. The term "network element" may be considered synonymous to and/or referred to as a "base station." As used herein, the term "base station" may be considered synonymous to and/or referred to as a node B, an enhanced or evolved node B (eNB), next generation nodeB (gNB), base transceiver station (BTS), access point (AP), roadside unit (RSU), etc., and may describe equipment that provides the radio baseband functions for data and/or voice connectivity between a network and one or more users. As used herein, the terms "vehicle-to-vehicle" and "V2V" may refer to any communication involving a vehicle as a source or destination of a message. Additionally, the terms "vehicle-to-vehicle" and "V2V" as used herein may also encompass or be equivalent to vehicle-to-infrastructure (V2I) communications, vehicle-to-network (V2N) communications, vehicle-to-pedestrian (V2P) communications, or V2X communications As used herein, the term "transmitter" or "receiver" may refer to any computer device, processor circuitry, interface circuitry, in addition to corresponding network elements, which may facilitate the communication between a transmitter and a receiver. As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information.

FIG. 1 illustrates an example communication system 100 including a transmitter 101 and a receiver 103 coupled by a physical channel 105, where a message 113 may be transmitted via a plurality of transmission voltage levels varied from a plurality of nominal voltage levels on the physical channel 105, in accordance with various embodiments. For clarity, features of the communication system 100, e.g., the transmitter 101, the receiver 103, and the physical channel 105, may be described below as examples for understanding an example communication system including a transmitter and a receiver coupled by a physical channel. It is to be understood that there may be more or fewer components within a communication system, a transmitter, a receiver, and/or a physical channel. Further, it is to be understood that one or more of the components within the communication system including a transmitter and a receiver coupled by a physical channel may include additional and/or varying features from the description below, and may include any device or system that one having ordinary skill in the art would consider and/or refer to as a communication system including a transmitter and a receiver coupled by a physical channel.

In embodiments, the communication system 100 may include the transmitter 101 and the receiver 103 coupled by the physical channel 105. In some embodiments, the physical channel 105 may include a first signal line 151 and a second signal line 153. A message 113 from the transmitter 101 may be transmitted on the physical channel 105 to be received by the receiver 103 to become a message 133. A first nominal voltage level on the first signal line 151 together with a second nominal voltage level on the second signal line 153 may represent a digital 0 of the message. A third nominal voltage level on the first signal line 151 together with a fourth nominal voltage on the second signal line 153 may represent a digital 1 of the message.

The transmitter 101 may include a voltage generator 111 to generate a plurality of transmission voltage levels varied in accordance with a sequence of voltage variations from the plurality of nominal voltage levels for the message. The receiver 103 may include a voltage detector 131 to determine the plurality of transmission voltage levels varied in accordance with a sequence of voltage variations from the plurality of nominal voltage levels for the message. The sequence of voltage variations from the plurality of nominal voltage levels may be used by the transmitter 101 and the receiver 103 to authenticate the message 113. In embodiments, the voltage generator 111 and the voltage detector 131 may be coupled to the first signal line 151 and the second signal line 153.

For example, the voltage generator 111 may select a first transmission voltage level for the first signal line 151, and a second transmission voltage level for the second signal line 153 to transmit the digital 0 of the message, and select a third transmission voltage level for the first signal line 151, and a fourth transmission voltage level for the second signal line 153 to transmit the digital 1 of the message. The first transmission voltage level may be different from the first nominal voltage by a first voltage variation, the second transmission voltage level may be different from the second nominal voltage by a second voltage variation, the third transmission voltage level may be different from the third nominal voltage by a third voltage variation, and the fourth transmission voltage level may be different from the fourth nominal voltage by a fourth voltage variation, and subsequent voltage variations until the end of the message. The sequence of voltage variations, e.g., the first voltage variation, the second voltage variation, the third voltage variation, and the fourth voltage variation, and subsequent voltage variations until the end of the message, may serve to authenticate the message from the transmitter 101 to the receiver 103.

In embodiments, the authentication of the message 113 may be performed based on a pseudo-random number generator 115 coupled to the voltage generator 111 within the transmitter 101, and a pseudo-random number generator 135 coupled to the voltage detector 131 within the receiver 103. The pseudo-random number generator 115 may generate a deterministic pseudo-random bit stream based on a common seed in possession by both the transmitter 101 and the receiver 103. The transmitter 101 may determine the sequence of voltage variations based at least in part on the deterministic pseudo-random bit stream, and the voltage generator 111 may generate the transmission voltage levels varied in accordance with a sequence of voltage variations from the plurality of nominal voltage levels for the message. At the receiving end, the pseudo-random number generator 135 may generate a same deterministic pseudo-random bit stream based on the common seed, and authenticate the message 113 based on the sequence of voltage variations from the plurality of nominal voltage levels detected by the voltage detector 131, matching the deterministic pseudo-random bit stream generated by the pseudo-random number generator 135.

In embodiments, the transmitter 101 and the receiver 103 may be a vehicle-embedded computer device (VECD), an ECU, a gateway, or any other devices that may include a processor, an interface, transmission means, a network element, or other components to facility a communication. An ECU, a gateway, or other devices, may serve as a transmitter at one moment and a receiver at other moment. A gateway may be a central unit responsible to detect intrusion. An ECU may be a generic term for an embedded system that controls an electrical system and/or subsystems in a vehicle. Vehicles, or transport vehicles, may include, for example, automobiles, aircraft, trains, busses, etc. In a vehicle, ECUs may be interconnected via a network, e.g., a CAN bus. ECUs may be configured to transmit and/or receive messages that contain commands and/or data. An ECU may be generally configured to provide control over some aspect of a vehicle, for example, electronic/engine control, powertrain control, transmission control, brake control, central control, central timing, body control, suspension control, airbags, power windows, doors, mirror adjustment, battery and recharging systems for hybrid/electric cars, etc. In some cases, one ECU may include one or more ECUs of one or more types. In some embodiments, a vehicle may include 100 or more ECUs for various subsystems.

In embodiments, the transmitter 101 and the receiver 103 may include the voltage generator 111 and/or the voltage detector 131. In some other embodiments, the voltage generator 111 and/or the voltage detector 131 may be a separated component placed at an interface of the transmitter 101 and the receiver 103 to the physical channel 105. In addition, the pseudo-random number generator 115 may be a part of the transmitter 101, a part of the voltage generator 111, or a separated component. Similarly, the pseudo-random number generator 135 may be a part of the receiver 103, a part of the voltage detector 131, or a separated component.

In embodiments, the physical channel 105 may be similar to a CAN bus that includes two signal lines, e.g., the first signal line 151 and the second signal line 153. A CAN bus may be a robust vehicle bus standard designed to allow microcontrollers and devices to communicate with each other in applications without a host computer. A CAN bus may support message-based protocols, designed for multiplex electrical wiring within a vehicle to save on copper. The original CAN bus may not have much security mechanism. Traditional cryptographic techniques may not be directly applicable to the original CAN buses and ECUs to provide improved information security. Embodiments herein may enhance the original CAN bus protocols to provide authentication mechanisms. Additionally and alternatively, the physical channel 105 herein may not be limited to a CAN bus like channel. For example, the physical channel 105 may include only one signal line, or multiple lines, instead of two signal lines.

Figure 2:
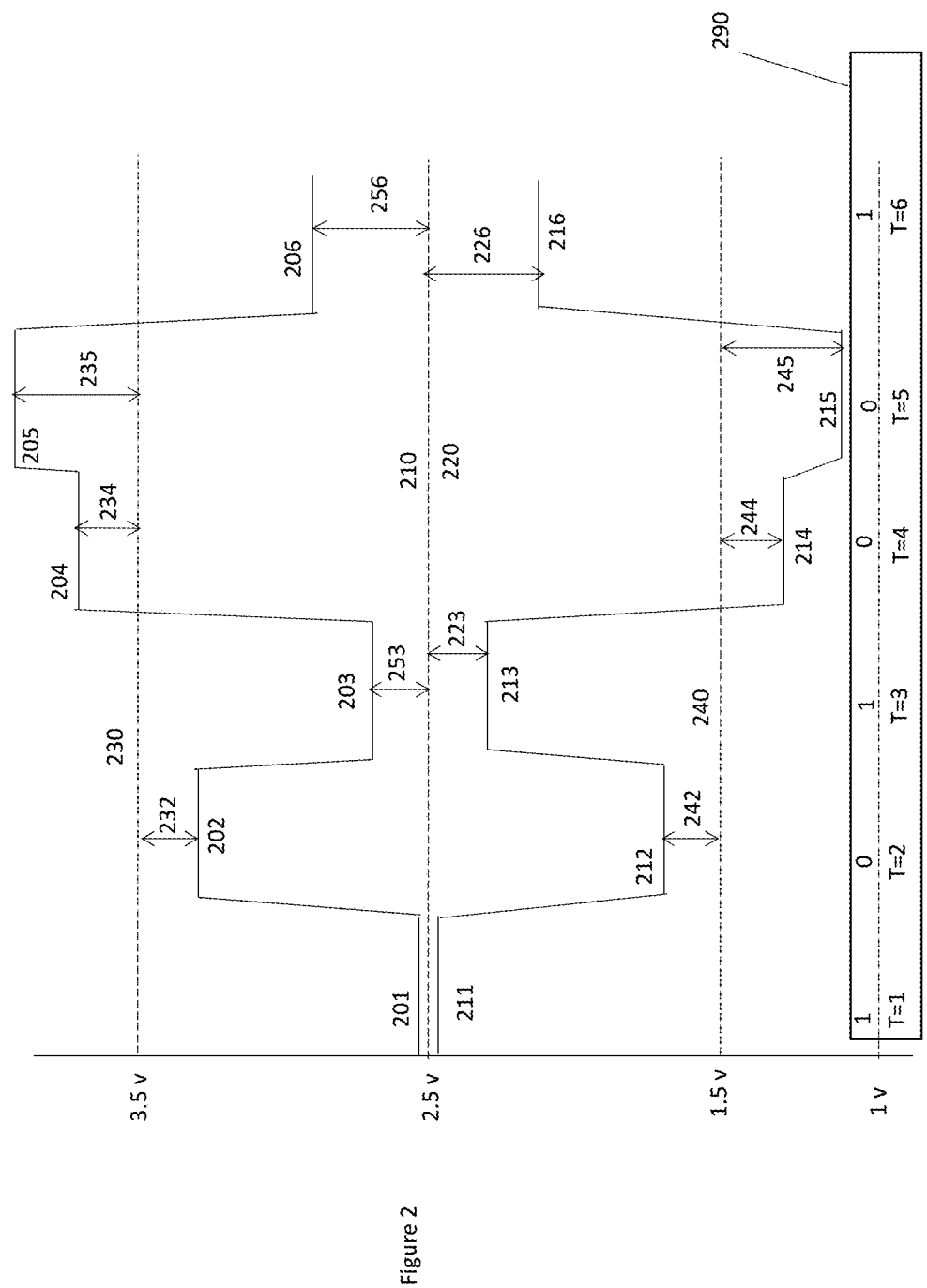
FIG. 2 illustrates examples of a plurality of transmission voltage levels varied from a plurality of nominal voltage levels to transmit a message on a physical channel of a communication system, in accordance with various embodiments.

FIG. 2 illustrates examples of a plurality of transmission voltage levels varied from a plurality of nominal voltage levels to transmit a message 290 on a physical channel of a communication system, in accordance with various embodiments. In embodiments, the plurality of transmission voltage levels varied from a plurality of nominal voltage levels may be for the physical channel 105, which may include the first signal line 151 and the second signal line 153, and the message 290 may be an example of the message 113.

In embodiments, the message 290 may include multiple bits, e.g., 101001, where a digit 1 may be transmitted at a first time instance, a digit 0 may be transmitted at a second time instance, a digit 1 may be transmitted at a third time instance, a digit 0 may be transmitted at a fourth time instance, a digit 0 may be transmitted at a fifth time instance, and a digit 1 may be transmitted at a sixth time instance. There may be multiple digit is and multiple digit 0s in the message 290. The message 290 may be transmitted by the first signal line 151 and the second signal line 153. A first nominal voltage level 210 on the first signal line 151, e.g., 2.5 v, together with a second nominal voltage level 220 on the second signal line 153, e.g., 2.5 v, may represent a digital 1 of the message. A third nominal voltage level 230 on the first signal line 151, e.g., 3.5 v, together with a fourth nominal voltage level 240 on the second signal line 153, e.g., 1.5 v, may represent a digital 0 of the message. In descriptions below, the first nominal voltage level 210 and the second nominal voltage level 220 may be a same voltage level, e.g., 2.5 v. Additionally and alternatively, in some other embodiments, the first nominal voltage level 210 and the second nominal voltage level 220 may be different from each other.

Traditionally, a digital 0 or a digital 1 may be represented by one voltage level. If a digital 0 is to be transmitted, a same nominal voltage level may be used to transmit the digit 0 at different time instances. Similarly, if a digit 1 is to be transmitted, another nominal voltage level may be used to transmit the digit 1 at different time instances. In some embodiments, different from the traditional approaches, there may be multiple and different transmission voltage levels used to transmit a digit 1, which may be varied from a plurality of nominal voltage levels on the physical channel. For example, the digit 1 at the first time instance may be transmit by a transmission voltage level 201, e.g., 2.52 v, at the first signal line 151, and a transmission voltage level 211, e.g., 2.48 v, at the second signal line 153. The digit 1 at the third time instance may be transmit by a transmission voltage level 203, e.g., 2.61 v, at the first signal line 151, and a transmission voltage level 213, e.g., 2.39 v at the second signal line 153. In addition, the digit 1 at the sixth time instance may be transmit by a transmission voltage level 206, e.g., 2.7 v, at the first signal line 151, and a transmission voltage level 216, e.g., 2.3 v, at the second signal line 153. The various transmission voltage levels at different time instances, e.g., 2.52 v, 2.61 v, and 2.7 v, may be selected from a first set of varied voltage levels varied from the first nominal voltage level 210, e.g., 2.5 v, for the first signal line 151. The various transmission voltage levels at different time instances, e.g., 2.48 v, 2.39 v, and 2.3 v, may be selected from a second set of varied voltage levels varied from a second nominal voltage level 220, e.g., 2.5 v, for the second signal line 153. More examples of a set of varied voltage levels varied from a nominal voltage level may be shown in FIG. 4 and FIG. 5.

Similarly, the digit 0 at the second time instance may be transmit by a transmission voltage level 202, e.g., 3.2 v, at the first signal line 151, and a transmission voltage level 212, e.g., 1.8 v, at the second signal line 153. The digit 0 at the fourth time instance may be transmit by a transmission voltage level 204, e.g., 3.6 v, at the first signal line 151, and a transmission voltage level 214, e.g., 1.4 v at the second signal line 153. In addition, the digit 0 at the fifth time instance may be transmit by a transmission voltage level 205, e.g., 3.7 v, at the first signal line 151, and a transmission voltage level 215, e.g., 1.3 v, at the second signal line 153. The various transmission voltage levels at different time instances, e.g., 3.2 v, 3.6 v, and 3.7 v, may be selected from a third set of varied voltage levels varied from the third nominal voltage level 230, e.g., 3.5 v, for the first signal line 151. The various transmission voltage levels at different time instances, e.g., 1.8 v, 1.4 v, and 1.3 v, may be selected from a fourth set of varied voltage levels varied from the fourth nominal voltage level 240, e.g., 1.5 v, for the second signal line 153.

As a consequence, there may be a sequence of voltage variations of the transmission voltage levels from the plurality of nominal voltage levels, e.g., a variation 232, a variation 234, a variation 235 from the third nominal voltage level 230 for the first signal line 151, a variation 253, and a variation 256 from the first nominal voltage level 210 for the first signal line 151, a variation 242, a variation 244, and a variation 245 from the fourth nominal voltage level 240 for the second signal line 153, and a variation 223, and a variation 226 from the second nominal voltage level 220 for the second signal line 153. In general, a sequence of voltage variations of the transmission voltage levels from the plurality of nominal voltage levels may be a sequence of voltage differences between the transmission voltage levels and the nominal voltage levels at different time instances. For example, as shown in FIG. 2, the sequence of voltage variations of the transmission voltage levels from the plurality of nominal voltage levels may be a sequence [0.02, −0.3, 0.11, 0.1, 0.2, 0.2] for the first signal line 151. Similarly, the sequence of voltage variations of the transmission voltage levels from the plurality of nominal voltage levels may be a sequence [−0.02, 0.3, −0.11, −0.1, −0.2, −0.2] for the second signal line 153. In some embodiments, a sequence of voltage variations of the transmission voltage levels from the plurality of nominal voltage levels for a first signal line may be symmetric to a sequence of voltage variations of the transmission voltage levels from the plurality of nominal voltage levels for a second signal line, when each corresponding voltage variation of the two sequences may have a same value with an opposite sign. For example, the sequence [0.02, −0.3, 0.11, 0.1, 0.2, 0.2] of voltage variation for the signal line 151 may be symmetric to the sequence [−0.02, 0.3, −0.11, −0.1, −0.2, −0.2] of voltage variation for the signal line 153. In some other embodiments, the sequence of voltage variations for the first signal line and the sequence of voltage variations for the second signal line may not be symmetric, or independent from each other, as shown in FIG. 3.

Figure 3:
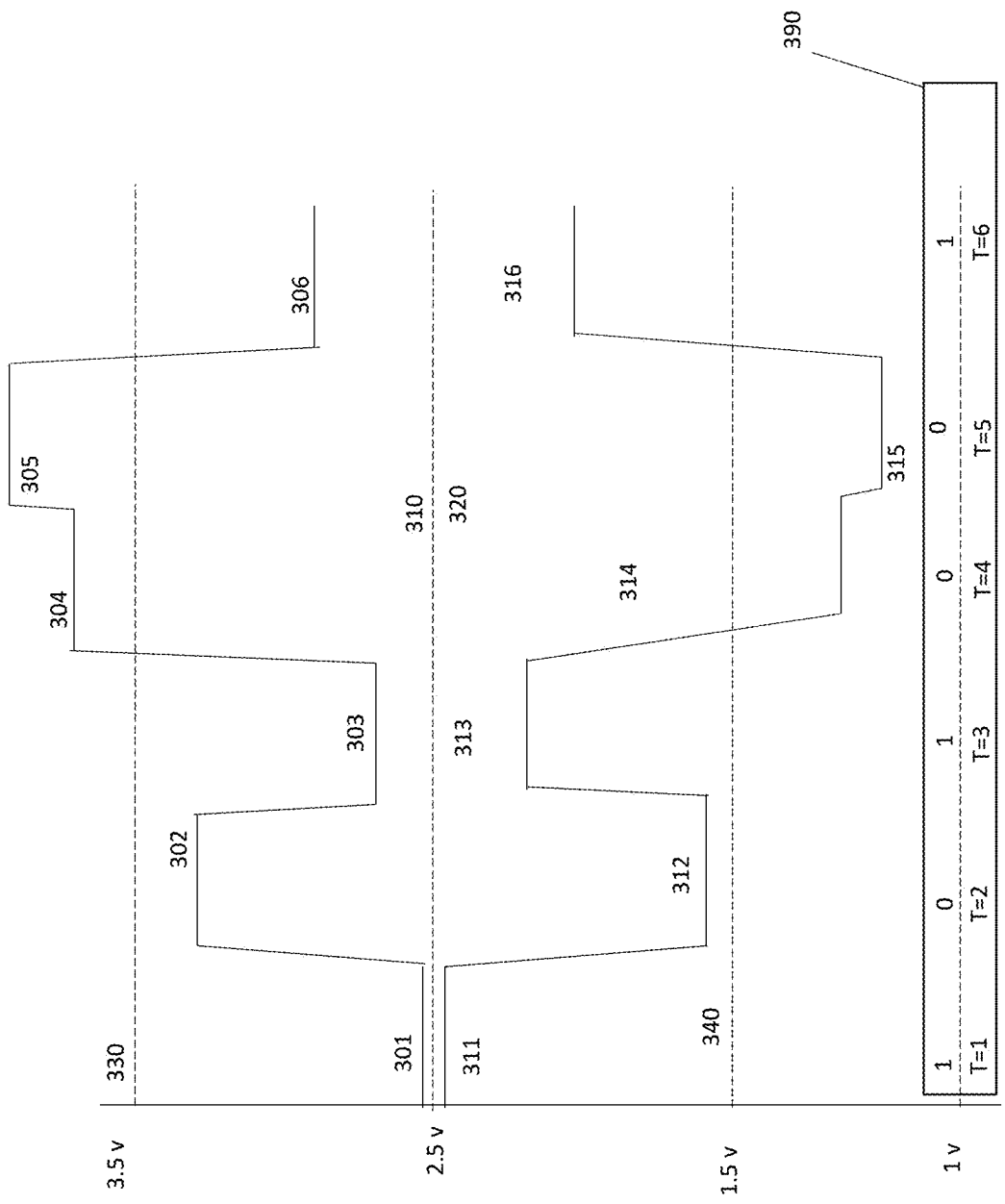
FIG. 3 illustrates further examples of a plurality of transmission voltage levels varied from a plurality of nominal voltage levels to transmit a message on a physical channel of a communication system, in accordance with various embodiments.

FIG. 3 illustrates further examples of a plurality of transmission voltage levels varied from a plurality of nominal voltage levels to transmit a message 390 on a physical channel of a communication system, in accordance with various embodiments. In embodiments, the plurality of transmission voltage levels varied from a plurality of nominal voltage levels may be for the physical channel 105, which may include the first signal line 151 and the second signal line 153, and the message 390 may be an example of the message 113.

In embodiments, the message 390 may include multiple bits, e.g., 101001, same as the message 290. The message 390 may be transmitted by the first signal line 151 and the second signal line 153. A first nominal voltage level 310 on the first signal line 151, e.g., 2.5 v, together with a second nominal voltage level 320 on the second signal line 153, e.g., 2.5 v, may represent a digital 1 of the message. A third nominal voltage level 330 on the first signal line 151, e.g., 3.5 v, together with a fourth nominal voltage level 340 on the second signal line 153, e.g., 1.5 v, may represent a digital 0 of the message.

A digit 1 at the first time instance may be transmit by a transmission voltage level 301, e.g., 2.52 v, at the first signal line 151, and a transmission voltage level 311, e.g., 2.38 v, at the second signal line 153. A digit 1 at the third time instance may be transmit by a transmission voltage level 303, e.g., 2.61 v, at the first signal line 151, and a transmission voltage level 313, e.g., 2.29 v at the second signal line 153. In addition, a digit 1 at the sixth time instance may be transmit by a transmission voltage level 306, e.g., 2.7 v, at the first signal line 151, and a transmission voltage level 316, e.g., 2.2 v, at the second signal line 153. The various transmission voltage levels at different time instances, e.g., 2.52 v, 2.61 v, and 2.7 v, may be selected from a first set of varied voltage levels varied from the first nominal voltage level 310, e.g., 2.5 v, for the first signal line 151. The various transmission voltage levels at different time instances, e.g., 2.38 v, 2.29 v, and 2.2 v, may be selected from a second set of varied voltage levels varied from a second nominal voltage level 320, e.g., 2.5 v, for the second signal line 153.

Similarly, a digit 0 at the second time instance may be transmit by a transmission voltage level 302, e.g., 3.2 v, at the first signal line 151, and a transmission voltage level 312, e.g., 1.6 v, at the second signal line 153. A digit 0 at the fourth time instance may be transmit by a transmission voltage level 304, e.g., 3.6 v, at the first signal line 151, and a transmission voltage level 314, e.g., 1.2 v at the second signal line 153. In addition, a digit 0 at the fifth time instance may be transmit by a transmission voltage level 305, e.g., 3.7 v, at the first signal line 151, and a transmission voltage level 315, e.g., 1.1 v, at the second signal line 153. The various transmission voltage levels at different time instances, e.g., 3.2 v, 3.6 v, and 3.7 v, may be selected from a third set of varied voltage levels varied from the third nominal voltage level 330, e.g., 3.5 v, for the first signal line 151. The various transmission voltage levels at different time instances, e.g., 1.6 v, 1.2 v, and 1.1 v, may be selected from a fourth set of varied voltage levels varied from the fourth nominal voltage level 340, e.g., 1.5 v, for the second signal line 153.

Accordingly, a sequence of voltage variations of the transmission voltage levels from the plurality of nominal voltage levels may be a sequence [0.02, −0.3, 0.11, 0.1, 0.2, 0.2] for the first signal line 151. Similarly, a sequence of voltage variations of the transmission voltage levels from the plurality of nominal voltage levels may be a sequence [−0.12, 0.1, −0.21, −0.3, −0.4, −0.3] for the second signal line 153. Therefore, the sequence of voltage variations [0.02, −0.3, 0.11, 0.1, 0.2, 0.2] may not be symmetric to the sequence of voltage variations [−0.12, 0.1, −0.21, −0.3, −0.4, −0.3]. For example, at the second time instance, the transmission voltage level is at 3.2 v, which has a voltage variation of −0.3 v compared to a nominal voltage 3.5 v at the first signal line. At the same second time instance, the transmission voltage level is at 1.6 v, which has a voltage variation of 0.1 v compared to a nominal voltage 1.5 v at the second signal line. Hence, the voltage variations for the first signal line and the second signal line are not symmetric to each other.

FIG. 4 illustrates examples of transmission voltage levels selected from a set of varied voltage levels, e.g., a set of varied voltage levels 411, a set of varied voltage levels 421, and a set of varied voltage levels 431, varied from nominal voltage levels on a physical channel, in accordance with various embodiments. In embodiments, the transmission voltage level 202, the transmission voltage level 204, and transmission voltage level 205, may be selected from the set of varied voltage levels 421. The transmission voltage level 201, the transmission voltage level 203, the transmission voltage level 206, the transmission voltage level 211, the transmission voltage level 213, and the transmission voltage level 216, may be selected from the set of varied voltage levels 411. The transmission voltage level 212, the transmission voltage level 214, and the transmission voltage level 215, may be selected from the set of varied voltage levels 431.

In embodiments, the transmission voltage level 202 may be selected from the set of varied voltage levels 421 based on a first pseudo random number. In addition, the transmission voltage level 204 may be selected from the set of varied voltage levels 421 based on a second pseudo random number, where the second pseudo random number may be different from the first pseudo random number. The first pseudo random number and the second pseudo random number may be generated by the pseudo-random number generator 115.

The set of varied voltage levels 421 may span a voltage interval, [2.75 v, 4.5 v], which may include a nominal voltage 420, e.g., 3.5 v. The set of varied voltage levels 411 may span a voltage interval, [1.5 v, 3 v], which may include a nominal voltage 410, e.g., 2.5 v. The set of varied voltage levels 430 may span a voltage interval [0.5 v, 2.25 v], which may include a nominal voltage 430, e.g., 1.5 v. In embodiments, a transmission voltage level may be selected from the set of varied voltage levels 421 for the first signal line 151, and a transmission voltage level may be selected from the set of varied voltage levels 431 for the second signal line 153, to represent a digit 0. On the other hand, a transmission voltage level may be selected from the set of varied voltage levels 411 for the first signal line 151, and a transmission voltage level may be selected from the set of varied voltage levels 411 for the second signal line 153, to represent a digit 1.

In addition to select transmission voltage levels from the sets of varied voltage levels, there may be additional conditions for the selection of transmission voltage levels. For example, in embodiments, a voltage difference between a transmission voltage level for the first signal line 151, and a transmission voltage level for the second signal line 153 may fall in a voltage interval 440, e.g., [−0.5 v, 0.05 v], to represent a digit 1. Similarly, a voltage difference between a transmission voltage level for the first signal line 151, and a transmission voltage level for the second signal line 153 may fall in a voltage interval 450, e.g., [1.5 v, 3 v], to represent a digit 0. In some other embodiments, other conditions may exist. For example, there may be no voltage variations allowed for a transmission voltage level from the nominal voltages for the first signal line.

In embodiments, when the physical channel 105 may be a CAN bus, the set of varied voltage levels may be within a tolerated voltage levels specified by CAN specification so that the CAN protocol may be maintained, i.e. timing, arbitration, etc. Consequently, embodiments herein may be backward compatible with the CAN bus specification.

In embodiments, a set of varied voltage levels includes voltages varied from a nominal voltage level for a signal line. A transmission voltage level may be selected from a set of varied voltage levels, which may have a voltage variation from the nominal voltage level for the signal line. The voltage difference between a transmission voltage level and a nominal voltage level are different from a voltage difference caused by process or environmental variations of the transmitter, the receiver, or the physical channel. Voltage differences caused by process variations or environmental variations may exist in reality, may be deemed as a noise from the nominal voltage, and may not be stable, controllable, or selectable. The voltage difference caused by a process variation or environmental variation may be analyzed by statistical tools, such as a profile or signature. On the other hand, a set of varied voltage levels includes voltages varied from a nominal voltage level for a signal line, which may be sufficiently distinct voltage levels, selectable and controllable by the voltage generator, and may be detectable in spite of process or environmental variations. Voltages in a set of varied voltage levels is not statistical in nature, and may have determined and stable voltage levels. Furthermore, voltage differences caused by process variations or environmental variations may still exist for a transmission voltage selected from a set of varied voltage levels.

FIG. 5 illustrates further examples of transmission voltage levels selected from a set of varied voltage levels, e.g., a set of varied voltage levels 511, a set of varied voltage levels 521, and a set of varied voltage levels 531, varied from nominal voltage levels on a physical channel, in accordance with various embodiments. Compared to the set of varied voltage levels 411, the set of varied voltage levels 421, and the set of varied voltage levels 431, which may span a voltage interval including a nominal voltage, the set of varied voltage levels 511, the set of varied voltage levels 521, and the set of varied voltage levels 531 may be a finite number of voltage levels within a voltage interval.

In embodiments, the transmission voltage level 202, the transmission voltage level 204, and transmission voltage level 205, may be selected from the set of varied voltage levels 521. The transmission voltage level 201, the transmission voltage level 203, the transmission voltage level 206, the transmission voltage level 211, the transmission voltage level 213, and the transmission voltage level 216, may be selected from the set of varied voltage levels 511. The transmission voltage level 212, the transmission voltage level 214, and the transmission voltage level 215, may be selected from the set of varied voltage levels 531. In embodiments, the transmission voltage level 202 may be selected from the set of varied voltage levels 521 based on a first pseudo random number. In addition, the transmission voltage level 204 may be selected from the set of varied voltage levels 521 based on a second pseudo random number, where the second pseudo random number may be different from the first pseudo random number. The first pseudo random number and the second pseudo random number may be generated by the pseudo-random number generator 115.

In embodiments, the set of varied voltage levels 511, the set of varied voltage levels 521, and the set of varied voltage levels 531 may include a finite number of voltage levels within a voltage interval, which may include a nominal voltage. For example, the set of varied voltage levels 511 may include a nominal voltage 510, the set of varied voltage levels 521 may include a nominal voltage 520, and the set of varied voltage levels 531 may include a nominal voltage 530. In some other embodiments, a set of varied voltage levels may exclude a nominal voltage but include voltage levels around a nominal voltage level. In embodiments, a transmission voltage level may be selected from the set of varied voltage levels 521 for the first signal line 151, and a transmission voltage level may be selected from the set of varied voltage levels 531 for the second signal line 153, to represent a digit 0. On the other hand, a transmission voltage level may be selected from the set of varied voltage levels 511 for the first signal line 151, and a transmission voltage level may be selected from the set of varied voltage levels 511 for the second signal line 153, to represent a digit 1.

In embodiments, any two adjacent voltage levels of the set of varied voltage levels 531, e.g., a voltage level 532, a voltage level 534, and a voltage level 536, may have an equal distance equals to a first predetermined voltage level gap. For example, a distance between the voltage level 532 and the voltage level 534 may be equal to a distance between the voltage level 534 and the voltage level 536, both equal to the first predetermined voltage level gap. In some embodiments, the first predetermined voltage level gap may be 0.05 v, or 0.018 v, or any other voltage difference that is stable and detected by a voltage detector. However, in some other embodiments, the distance between the voltage level 532 and the voltage level 534 may be different from a distance between the voltage level 534 and the voltage level 536.

In embodiments, any two adjacent voltage levels of the set of varied voltage levels 521, e.g., a voltage level 522, a voltage level 524, and a voltage level 526, may have an equal distance equals to a second predetermined voltage level gap. For example, a distance between the voltage level 522 and the voltage level 524 may be equal to a distance between the voltage level 524 and the voltage level 526, both equal to the second predetermined voltage level gap. However, in some other embodiments, the distance between the voltage level 522 and the voltage level 524 may be different from a distance between the voltage level 524 and the voltage level 526.

In embodiments, any two adjacent voltage levels of the set of varied voltage levels 511, e.g., a voltage level 512, a voltage level 514, and a voltage level 516, may have an equal distance equals to a third predetermined voltage level gap. For example, a distance between the voltage level 512 and the voltage level 514 may be equal to a distance between the voltage level 514 and the voltage level 516, both equal to the third predetermined voltage level gap. However, in some other embodiments, the distance between the voltage level 512 and the voltage level 514 may be different from a distance between the voltage level 514 and the voltage level 516.

In embodiments, the three set of varied voltage levels, the set of varied voltage levels 511, the set of varied voltage levels 521, and the set of varied voltage levels 531 may be provided as examples only and are not limiting. For example, there may be a fourth set of varied voltage levels, where any two adjacent voltage levels of the fourth set of varied voltage levels may have an equal distance equals to a fourth predetermined voltage level gap. In some embodiments, the first predetermined voltage level gap may be different from the third predetermined voltage level gap. In some other embodiments, the first predetermined voltage level gap may be equal to the second predetermined voltage level gap, or the third predetermined voltage level gap may be equal to the fourth predetermined voltage level gap.

For example, when the physical channel 105 is a CAN bus including the first signal line 151 (CANH) and the second signal line 153 (CANL), a set of varied voltage levels may include 16 levels shown in the table below, which are 50 mV apart for dominant levels to represent a digit 0, and 18 mV apart for the recessive levels to represent a digit 1. A random four bit digits may be used to select a corresponding transmission voltage levels. For example, a random four bit digits 0011 may be used to select a transmission voltage 3.3 v for the first signal line 151, and a transmission voltage 1.5 v for the second signal line 153 to transmit a digit 0; or to select a transmission voltage 2.646 v for the first signal line 151, and a transmission voltage 2.254 v for the second signal line 153 to transmit a digit 1.

| Bits | Dominant (V) | Dominant (V) | Recessive (V) | Recessive (V) |
|------|--------------|--------------|---------------|---------------|
| 0000 | 3.15 | 1.65 | 2.2 | 2.7 |
| 0001 | 3.20 | 1.60 | 2.218 | 2.682 |
| 0010 | 3.25 | 1.55 | 2.236 | 2.664 |
| 0011 | 3.30 | 1.50 | 2.254 | 2.646 |
| 0100 | 3.35 | 1.45 | 2.272 | 2.628 |
| 0101 | 3.40 | 1.40 | 2.29 | 2.61 |
| 0110 | 3.45 | 1.35 | 2.308 | 2.592 |
| 0111 | 3.50 | 1.30 | 2.326 | 2.574 |
| 1000 | 3.55 | 1.25 | 2.344 | 2.556 |
| 1001 | 3.60 | 1.20 | 2.362 | 2.538 |
| 1010 | 3.65 | 1.15 | 2.38 | 2.52 |
| 1011 | 3.70 | 1.10 | 2.398 | 2.502 |
| 1100 | 3.75 | 1.05 | 2.416 | 2.484 |
| 1101 | 3.80 | 1.00 | 2.434 | 2.466 |
| 1110 | 3.85 | 0.95 | 2.452 | 2.448 |
| 1111 | 3.90 | 0.90 | 2.47 | 2.43 |

Figure 6:
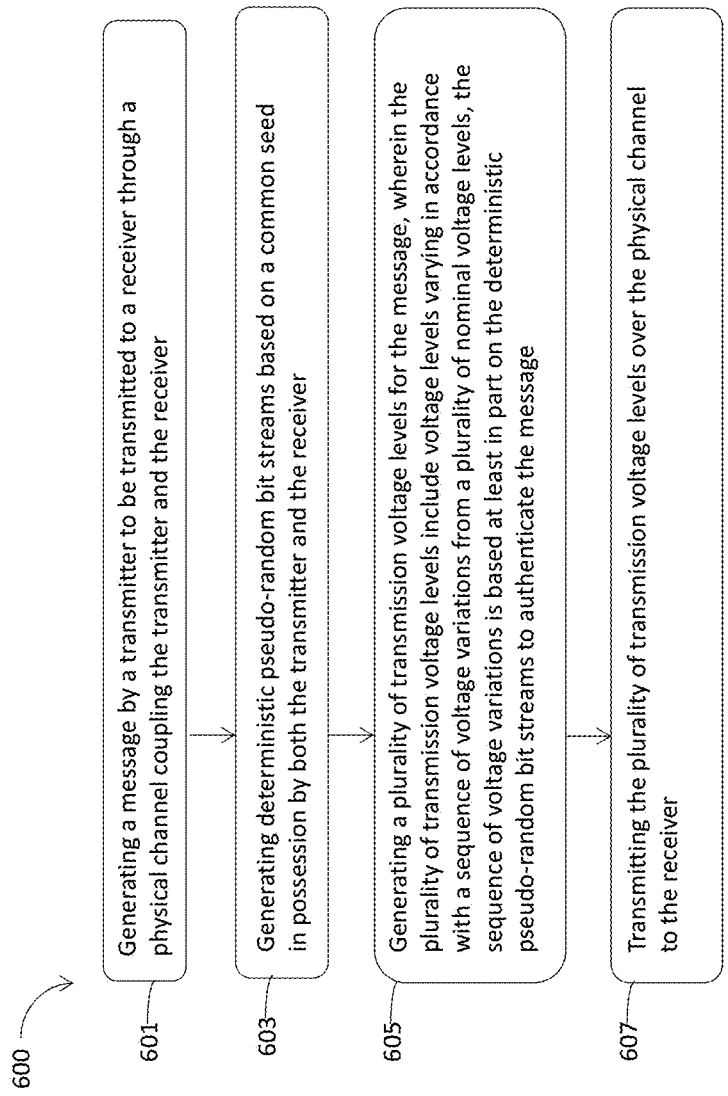
FIG. 6 illustrates an example process for a transmitter to transmit a message via a plurality of transmission voltage levels varied from a plurality of nominal voltage levels on a physical channel, in accordance with various embodiments.

FIG. 6 illustrates an example process 600 for a transmitter to transmit a message via a plurality of transmission voltage levels varied from a plurality of nominal voltage levels on a physical channel, in accordance with various embodiments. In embodiments, the process 600 may be a process performed by the transmitter 101 in FIG. 1.

The process 600 may start at an interaction 601. During the interaction 601, the transmitter may generate a message by a transmitter to be transmitted to a receiver through a physical channel coupling the transmitter and the receiver. For example, at the interaction 601, the transmitter 101 may generate the message 113 or the message 290 to be transmitted to the receiver 103 through the physical channel 105.

During an interaction 603, the transmitter may generate deterministic pseudo-random bit streams based on a common seed in possession by both the transmitter and the receiver. For example, at the interaction 603, the transmitter 101 or the pseudo-random number generator 115 within the transmitter 101 may generate deterministic pseudo-random bit streams based on a common seed in possession by both the transmitter 101 and the receiver 103.

During an interaction 605, the transmitter may generate a plurality of transmission voltage levels for the message. The plurality of transmission voltage levels may include voltage levels varying in accordance with a sequence of voltage variations from a plurality of nominal voltage levels, where the sequence of voltage variations may be based at least in part on the deterministic pseudo-random bit streams to authenticate the message. For example, at the interaction 605, for the message 290, the transmitter 101 or the voltage generator 111 within the transmitter 101 may generate a plurality of transmission voltage levels, e.g., the transmission voltage level 201, the transmission voltage level 202, the transmission voltage level 203, the transmission voltage level 204, the transmission voltage level 205, and the transmission voltage level 206, for the first signal line 151. In addition, the transmitter 101 or the voltage generator 111 within the transmitter 101 may generate the transmission voltage level 211, the transmission voltage level 212, the transmission voltage level 213, the transmission voltage level 214, the transmission voltage level 215, and the transmission voltage level 216, for the second signal line 153. The different transmission voltage levels for digit 1, e.g., the transmission voltage level 201, the transmission voltage level 203, the transmission voltage level 206, the transmission voltage level 211, the transmission voltage level 213, the transmission voltage level 216, may be different from the nominal voltage level, and may be generated based on deterministic pseudo-random bit streams generated during interaction 603. The different transmission voltage levels for digit 0 may be generated similarly.

During an interaction 607, the transmitter may transmit the plurality of transmission voltage levels over the physical channel to the receiver. For example, at the interaction 607, for the message 290, the transmitter 101 may transmit the plurality of transmission voltage levels, e.g., the transmission voltage level 201, the transmission voltage level 202, the transmission voltage level 203, the transmission voltage level 204, the transmission voltage level 205, and the transmission voltage level 206, for the first signal line 151 to the receiver 103. In addition, the transmitter 101 may transmit the transmission voltage level 211, the transmission voltage level 212, the transmission voltage level 213, the transmission voltage level 214, the transmission voltage level 215, and the transmission voltage level 216, for the second signal line 153 to the receiver 103.

Figure 7:
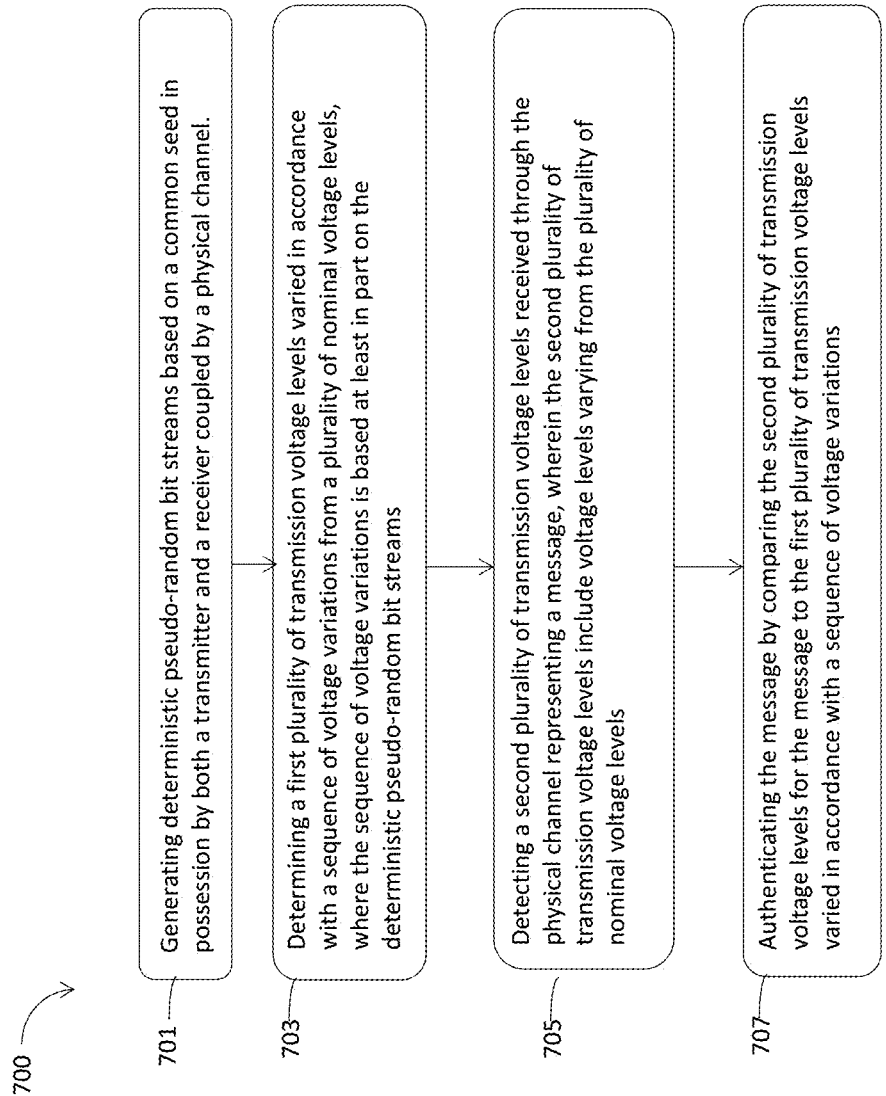
FIG. 7 illustrates an example process for a receiver to authenticate a message via a plurality of transmission voltage levels varied from a plurality of nominal voltage levels on a physical channel, in accordance with various embodiments.

FIG. 7 illustrates an example process 700 for a receiver to authenticate a message via a plurality of transmission voltage levels varied from a plurality of nominal voltage levels on a physical channel, in accordance with various embodiments. In embodiments, the process 700 may be a process performed by the receiver 103 in FIG. 1.

The process 700 may start at an interaction 701. During the interaction 701, the receiver may generate deterministic pseudo-random bit streams based on a common seed in possession by both a transmitter and a receiver coupled by a physical channel. For example, at the interaction 701, the receiver 103 or the pseudo-random number generator 135 within the receiver 103 may generate deterministic pseudo-random bit streams based on a common seed in possession by both the transmitter 101 and the receiver 103 coupled by a physical channel 105.

During an interaction 703, the receiver may determine a first plurality of transmission voltage levels varied in accordance with a sequence of voltage variations from a plurality of nominal voltage levels, where the sequence of voltage variations is based at least in part on the deterministic pseudo-random bit streams. For example, at the interaction 703, the receiver 103 may determine a first plurality of transmission voltage levels varied in accordance with a sequence of voltage variations from a plurality of nominal voltage levels, where the sequence of voltage variations may be based at least in part on the deterministic pseudo-random bit streams generated by the pseudo-random number generator 135.

During an interaction 705, the receiver may detect a second plurality of transmission voltage levels received through the physical channel representing a message, wherein the second plurality of transmission voltage levels include voltage levels varying from the plurality of nominal voltage levels. For example, at the interaction 705, the receiver 103 or the voltage detector 131 within the receiver 103 may detect a second plurality of transmission voltage levels received through the physical channel 105 representing a message, wherein the second plurality of transmission voltage levels include voltage levels varying from the plurality of nominal voltage levels. For example, the voltage detector 131 may detect the transmission voltage level 201, the transmission voltage level 202, the transmission voltage level 203, the transmission voltage level 204, the transmission voltage level 205, and the transmission voltage level 206, for the first signal line 151. In addition, the voltage detector 131 may detect the transmission voltage level 211, the transmission voltage level 212, the transmission voltage level 213, the transmission voltage level 214, the transmission voltage level 215, and the transmission voltage level 216, for the second signal line 153.

During an interaction 707, the receiver may authenticate the message by comparing the second plurality of transmission voltage levels for the message to the first plurality of transmission voltage levels varied in accordance with a sequence of voltage variations. For example, at the interaction 707, for the message 290, the receiver 103 may compare the first plurality of transmission voltage levels varied in accordance with a sequence of voltage variations from a plurality of nominal voltage levels, with the detected transmission voltage levels, e.g., the transmission voltage level 201, the transmission voltage level 202, the transmission voltage level 203, the transmission voltage level 204, the transmission voltage level 205, and the transmission voltage level 206, for the first signal line 151; and the transmission voltage level 211, the transmission voltage level 212, the transmission voltage level 213, the transmission voltage level 214, the transmission voltage level 215, and the transmission voltage level 216, for the second signal line 153. If the second plurality of transmission voltage levels detected by the voltage detector 131 matches the first plurality of transmission voltage levels varied in accordance with a sequence of voltage variations determined based on deterministic pseudo-random bit streams, the message is authenticated and valid. Otherwise, the message fails the authentication and is assumed to be invalid.

Figure 8:
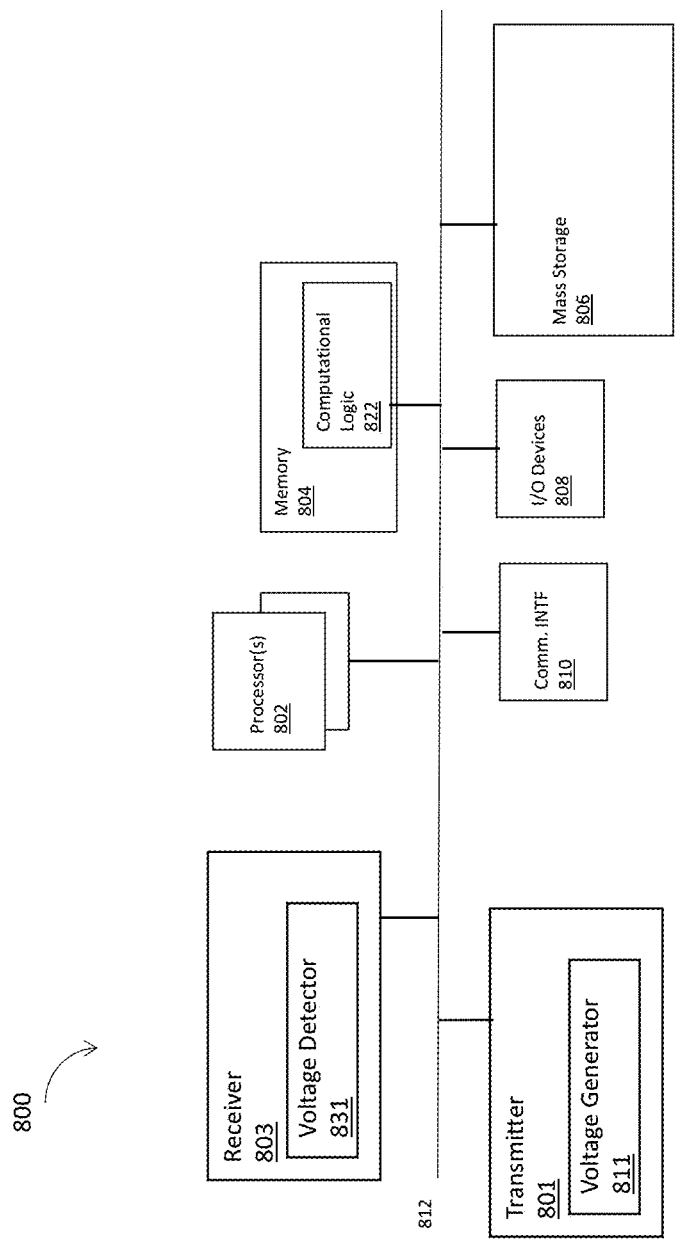
FIG. 8 illustrates an example device suitable for use to practice various aspects of the present disclosure, in accordance with various embodiments.

FIG. 8 illustrates an example computing device 800 that may include and/or be suitable for use with various components described herein. As shown, computing device 800 may include a processor 802, a system memory 804, and a mass storage 806.

The processor 802 may include any type of processors, such as a central processing unit (CPU), a microprocessor, and the like. The processor 802 may be implemented as an integrated circuit having multi-cores, e.g., a multi-core microprocessor. In some embodiments, in addition to processor cores, processor 802 may include a hardware accelerator, such as programmable circuit, e.g., Field Programmable Gate Arrays (FPGA). The computing device 800 may include mass storage devices 806 (such as diskette, hard drive, volatile memory (e.g., dynamic random-access memory (DRAM), compact disc read-only memory (CD-ROM), digital versatile disk (DVD), and so forth). In general, system memory 804 and/or mass storage devices 806 may be temporal and/or persistent storage of any type, including, but not limited to, volatile and non-volatile memory, optical, magnetic, and/or solid state mass storage, and so forth. Volatile memory may include, but is not limited to, static and/or dynamic random access memory. Non-volatile memory may include, but is not limited to, electrically erasable programmable read-only memory, phase change memory, resistive memory, and so forth.

The computing device 800 may further include I/O devices 808 (such as a display (e.g., a touchscreen display), keyboard, cursor control, remote control, gaming controller, image capture device, and so forth) and communication interfaces 810 (such as network interface cards, modems, infrared receivers, radio receivers (e.g., Bluetooth), and so forth). In some embodiments the I/O devices 808 may be coupled with the other components of the computing device 800, not shown.

The communication interfaces 810 may include a transmitter 801 and a receiver 803 coupled by a system bus 812. The transmitter 801 may include a voltage generator 811, and the receiver 803 may include a voltage detector 831. In some embodiments, the transmitter 801, and the receiver 803, may be examples of the transmitter 101, the receiver 103, to be coupled to a physical communication channel, such as the physical channel 105, as shown in FIG. 1.

In some embodiments, the communication interfaces 810 may further include communication chips (not shown) that may be configured to operate the device 800 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 810 may operate in accordance with other wireless protocols in other embodiments. In some embodiments, the communication interfaces 810 may be, may include, and/or may be coupled with the EC and/or TCPM as described herein.

The above-described computing device 800 elements may be coupled to each other via system bus 812, which may represent one or more buses. In the case of multiple buses, they may be bridged by one or more bus bridges (not shown). Each of these elements may perform its conventional functions known in the art. In particular, system memory 804 and mass storage devices 806 may be employed to store a working copy and a permanent copy of the programming instructions for the operation of various components of computing device 800, including but not limited to an operating system of computing device 800 and/or one or more applications. The various elements may be implemented by assembler instructions supported by the processor 802 or high-level languages that may be compiled into such instructions.

The permanent copy of the programming instructions may be placed into mass storage devices 806 in the factory, or in the field through, for example, a distribution medium (not shown), such as a compact disc (CD), or through communication interface 810 (from a distribution server (not shown)). That is, one or more distribution media having an implementation of the agent program may be employed to distribute the agent and to program various computing devices.

The number, capability, and/or capacity of the elements 808, 810, 812 may vary, depending on whether computing device 800 is used as a stationary computing device, such as a set-top box or desktop computer, or a mobile computing device, such as a tablet computing device, laptop computer, game console, or smartphone. Their constitutions are otherwise known, and accordingly will not be further described.

In embodiments, memory 804 may include computational logic 822 configured to implement various firmware and/or software services associated with operations of the computing device 800. For some embodiments, at least the processor 802 may be packaged together with computational logic 822 configured to practice aspects of embodiments described herein to form a system in package (SiP) or a SoC.

In various implementations, the computing device 800 may comprise one or more components of a data center, a laptop, a netbook, a notebook, an ultrabook, a smartphone, a tablet, a personal digital assistant (PDA), an ultra mobile PC, a mobile phone, or a digital camera. In further implementations, the computing device 800 may be any other electronic device that processes data.

EXAMPLES

Example 1 may include an apparatus for communication, comprising: a transmitter to transmit a message to a receiver via a physical channel coupling the transmitter and the receiver, and via a plurality of transmission voltage levels varied from a plurality of nominal voltage levels on the physical channel, wherein the transmitter includes: a voltage generator to generate the plurality of transmission voltage levels varied in accordance with a sequence of voltage variations from the plurality of nominal voltage levels for the message, with the sequence of voltage variations serve to authenticate the message.

Example 2 may include the apparatus of example 1 and/or some other examples herein, wherein: the physical channel includes a first signal line and a second signal line; the voltage generator is coupled to the first signal line and the second signal line; the voltage generator is to select a first transmission voltage level of the plurality of transmission voltage levels from a first set of varied voltage levels varied from a first nominal voltage level for the first signal line, and a second transmission voltage level of the plurality of transmission voltage levels from a second set of varied voltage levels varied from a second nominal voltage level for the second signal line to represent a digital 0 of the message; and the voltage generator is to select a third transmission voltage level of the plurality of transmission voltage levels from a third set of varied voltage levels varied from a third nominal voltage level for the first signal line, and a fourth transmission voltage level of the plurality of transmission voltage levels selected from a fourth set of varied voltage levels varied from a fourth nominal voltage level for the second signal line to represent a digital 1 of the message.

Example 3 may include the apparatus of example 1 and/or some other examples herein, wherein the transmitter further includes: a pseudo-random number generator coupled to the voltage generator to generate a deterministic pseudo-random bit stream based on a common seed in possession by both the transmitter and the receiver, wherein the sequence of voltage variations is based at least in part on the deterministic pseudo-random bit stream.

Example 4 may include the apparatus of any one of examples 1-3 and/or some other examples herein, wherein the voltage generator selects the first transmission voltage level from the first set of varied voltage levels based on a first pseudo random number, and the voltage generator selects the second transmission voltage level from the second set of varied voltage levels based on a second pseudo random number.

Example 5 may include the apparatus of any one of examples 1-3 and/or some other examples herein, wherein: the first nominal voltage level on the first signal line together with the second nominal voltage level on the second signal line represents a digital 0 of the message, the first set of varied voltage levels spans a first voltage interval that includes the first nominal voltage, and the second set of varied voltage levels spans a second voltage interval that includes the second nominal voltage; the third nominal voltage level on the first signal line together with the fourth nominal voltage on the second signal line represents a digital 1 of the message, the third set of varied voltages spans a third interval that includes the third nominal voltage, and the fourth set of voltage levels spans a fourth voltage interval that includes the fourth nominal voltage.

Example 6 may include the apparatus of example 5 and/or some other examples herein, wherein the first nominal voltage is 3.5 voltage (v), the second nominal voltage is 1.5 v, the first voltage interval is [2.75 v, 4.5 v], and the second voltage interval is [0.5 v, 2.25 v]; the third nominal voltage is 2.5 v, the fourth nominal voltage is 2.5 v, the third voltage interval is [1.5 v, 3 v], and the fourth voltage interval is [1.5 v, 3 v].

Example 7 may include the apparatus of any one of examples 1-3 and/or some other examples herein, wherein: the first set of varied voltage levels includes multiple voltage levels, wherein any two adjacent voltage levels of the first set of varied voltage levels has an equal distance equals to a first predetermined voltage level gap; the second set of varied voltage levels includes multiple voltage levels, wherein any two adjacent voltage levels of the second set of varied voltage levels has an equal distance equals to a second predetermined voltage level gap; the third set of varied voltage levels includes multiple voltage levels, wherein any two adjacent voltage levels of the third set of varied voltage levels has an equal distance equals to a third predetermined voltage level gap; or the fourth set of varied voltage levels includes multiple voltage levels, wherein any two adjacent voltage levels of the fourth set of varied voltage levels has an equal distance equals to a fourth predetermined voltage level gap.

Example 8 may include the apparatus of example 7 and/or some other examples herein, wherein the first predetermined voltage level gap is different from the third predetermined voltage level gap.

Example 9 may include the apparatus of example 7 and/or some other examples herein, wherein the first predetermined voltage level gap is 0.05 v, and the third predetermined voltage level gap is 0.018 v.

Example 10 may include the apparatus of example 7 and/or some other examples herein, wherein the first predetermined voltage level gap is equal to the second predetermined voltage level gap, or the third predetermined voltage level gap is equal to the fourth predetermined voltage level gap.

Example 11 may include the apparatus of any one of examples 1-3 and/or some other examples herein, wherein the digital 0 and the digital 1 of the message are a first digital 0 and a first digital 1 of the message, and the voltage generator is to select a fifth transmission voltage level from the first set of varied voltage levels for the first signal line and a sixth transmission voltage level from the second set of varied voltage levels for the second signal line to represent a second digital 0 of the message, and the voltage generator is to select a seventh transmission voltage level from the third set of varied voltage levels for the first signal line and an eighth transmission voltage level from the fourth set of varied voltage levels for the second signal line to represent a second digital 1 of message.

Example 12 may include the apparatus of example 11 and/or some other examples herein, wherein: the first transmission voltage level is different from the fifth transmission voltage level, the second transmission voltage level is different from the sixth transmission voltage level, the third transmission voltage level is different from the seventh transmission voltage level, or the fourth transmission voltage level is different from the eighth transmission voltage level.

Example 13 may include the apparatus of any one of examples 1-3 and/or some other examples herein, wherein the apparatus is an electronic control unit (ECU) or a gateway, and the physical channel is a part of a Controller Area Network (CAN) bus.

Example 14 may include an apparatus for communication, comprising: a receiver to receive a message from a transmitter via a physical channel coupling the transmitter and the receiver, and via a plurality of transmission voltage levels varied from a plurality of nominal voltage levels on the physical channel; and a voltage detector to authenticate the message by determining the plurality of transmission voltage levels varied in accordance with a sequence of voltage variations from the plurality of nominal voltage levels for the message.

Example 15 may include the apparatus of example 14 and/or some other examples herein, wherein: the physical channel includes a first signal line and a second signal line; the voltage detector is coupled to the first signal line and the second signal line; the voltage detector is to determine a first transmission voltage level of the plurality of transmission voltage levels to be selected from a first set of varied voltage levels varied from a first nominal voltage level for the first signal line, and a second transmission voltage level of the plurality of transmission voltage levels to be selected from a second set of varied voltage levels varied from a second nominal voltage level for the second signal line to represent a digital 0 of the message; and the voltage detector is to determine a third transmission voltage level of the plurality of transmission voltage levels to be selected from a third set of varied voltage levels varied from a third nominal voltage level for the first signal line, and a fourth transmission voltage level of the plurality of transmission voltage levels to be selected from a fourth set of varied voltage levels varied from a fourth nominal voltage level for the second signal line to represent a digital 1 of the message.

Example 16 may include the apparatus of example 14 and/or some other examples herein, wherein the receiver further includes: a pseudo-random number generator coupled to the voltage detector to generate a deterministic pseudo-random bit stream based on a common seed in possession by both the transmitter and the receiver, wherein the sequence of voltage variations is based at least in part on the deterministic pseudo-random bit stream.

Example 17 may include the apparatus of any one of examples 14-16 and/or some other examples herein, wherein the voltage detector determines the first transmission voltage level to be selected from the first set of varied voltage levels based on a first pseudo random number, and the voltage detector determines the second transmission voltage level to be selected from the second set of varied voltage levels based on a second pseudo random number.

Example 18 may include the apparatus of any one of examples 14-16 and/or some other examples herein, wherein: the first nominal voltage level on the first signal line together with the second nominal voltage level on the second signal line represents a digital 0 of the message, the first set of varied voltage levels spans a first voltage interval that includes the first nominal voltage, and the second set of varied voltage levels spans a second voltage interval that includes the second nominal voltage; the third nominal voltage level on the first signal line together with the fourth nominal voltage on the second signal line represents a digital 1 of the message, the third set of varied voltages spans a third interval that includes the third nominal voltage, and the fourth set of voltage levels spans a fourth voltage interval that includes the fourth nominal voltage.

Example 19 may include the apparatus of any one of examples 14-16 and/or some other examples herein, wherein: the first set of varied voltage levels includes multiple voltage levels, wherein any two adjacent voltage levels of the first set of varied voltage levels has an equal distance equals to a first predetermined voltage level gap; the second set of varied voltage levels includes multiple voltage levels, wherein any two adjacent voltage levels of the second set of varied voltage levels has an equal distance equals to a second predetermined voltage level gap; the third set of varied voltage levels includes multiple voltage levels, wherein any two adjacent voltage levels of the third set of varied voltage levels has an equal distance equals to a third predetermined voltage level gap; or the fourth set of varied voltage levels includes multiple voltage levels, wherein any two adjacent voltage levels of the fourth set of varied voltage levels has an equal distance equals to a fourth predetermined voltage level gap.

Example 20 may include the apparatus of example 19 and/or some other examples herein, wherein the first predetermined voltage level gap is different from the third predetermined voltage level gap.

Example 21 may include the apparatus of example 19 and/or some other examples herein, wherein the first predetermined voltage level gap is equal to the second predetermined voltage level gap, or the third predetermined voltage level gap is equal to the fourth predetermined voltage level gap.

Example 22 may include the apparatus of any one of examples 14-16 and/or some other examples herein, wherein the apparatus is an electronic control unit (ECU) or a gateway, and the physical channel is a part of a Controller Area Network (CAN) bus.

Example 23 may include a method for authenticating a message between a transmitter and a receiver, comprising: generating a message by the transmitter to be transmitted to the receiver through a physical channel coupling the transmitter and the receiver; generating deterministic pseudo-random bit streams based on a common seed in possession by both the transmitter and the receiver; generating a plurality of transmission voltage levels for the message, wherein the plurality of transmission voltage levels include voltage levels varying in accordance with a sequence of voltage variations from a plurality of nominal voltage levels, the sequence of voltage variations is based at least in part on the deterministic pseudo-random bit streams to authenticate the message; and transmitting the plurality of transmission voltage levels over the physical channel to the receiver.

Example 24 may include the method of example 24 and/or some other examples herein, wherein: the physical channel includes a first signal line and a second signal line; and the generating the plurality of transmission voltage levels includes: selecting a first transmission voltage level of the plurality of transmission voltage levels from a first set of varied voltage levels varied from a first nominal voltage level for the first signal line, and a second transmission voltage level of the plurality of transmission voltage levels from a second set of varied voltage levels varied from a second nominal voltage level for the second signal line to represent a digital 0 of the message; and selecting a third transmission voltage level of the plurality of transmission voltage levels from a third set of varied voltage levels varied from a third nominal voltage level for the first signal line, and a fourth transmission voltage level of the plurality of transmission voltage levels selected from a fourth set of varied voltage levels varied from a fourth nominal voltage level for the second signal line to represent a digital 1 of the message.

Example 25 may include the method of any one of examples 23-24 and/or some other examples herein, wherein: the first nominal voltage level on the first signal line together with the second nominal voltage level on the second signal line represents a digital 0 of the message, the first set of varied voltage levels spans a first voltage interval that includes the first nominal voltage, and the second set of varied voltage levels spans a second voltage interval that includes the second nominal voltage; the third nominal voltage level on the first signal line together with the fourth nominal voltage on the second signal line represents a digital 1 of the message, the third set of varied voltages spans a third interval that includes the third nominal voltage, and the fourth set of voltage levels spans a fourth voltage interval that includes the fourth nominal voltage.

Example 26 may include the method of any one of examples 23-24 and/or some other examples herein, wherein: the first set of varied voltage levels includes multiple voltage levels, wherein any two adjacent voltage levels of the first set of varied voltage levels has an equal distance equals to a first predetermined voltage level gap; the second set of varied voltage levels includes multiple voltage levels, wherein any two adjacent voltage levels of the second set of varied voltage levels has an equal distance equals to a second predetermined voltage level gap; the third set of varied voltage levels includes multiple voltage levels, wherein any two adjacent voltage levels of the third set of varied voltage levels has an equal distance equals to a third predetermined voltage level gap; or the fourth set of varied voltage levels includes multiple voltage levels, wherein any two adjacent voltage levels of the fourth set of varied voltage levels has an equal distance equals to a fourth predetermined voltage level gap.

Example 27 may include the method of example 26 and/or some other examples herein, wherein the first predetermined voltage level gap is different from the third predetermined voltage level gap.

Example 28 may include the method of any one of examples 23-24 and/or some other examples herein, wherein the digital 0 and the digital 1 of the message are a first digital 0 and a first digital 1 of the message, and the generating the plurality of transmission voltage levels further includes: selecting a fifth transmission voltage level from the first set of varied voltage levels for the first signal line and a sixth transmission voltage level from the second set of varied voltage levels for the second signal line to represent a second digital 0 of the message; and selecting a seventh transmission voltage level from the third set of varied voltage levels for the first signal line and an eighth transmission voltage level from the fourth set of varied voltage levels for the second signal line to represent a second digital 1 of message.

Example 29 may include the method of any one of examples 23-24 and/or some other examples herein, wherein the apparatus is an electronic control unit (ECU) or a gateway, and the physical channel is a part of a Controller Area Network (CAN) bus.

Example 30 may include one or more computer-readable media having instructions for a computer device to form an electronic apparatus, upon execution of the instructions by one or more processors, to perform the method of any one of examples 23-29.

Example 31 may include an apparatus for authenticating a message between a transmitter and a receiver, comprising: means for generating deterministic pseudo-random bit streams based on a common seed in possession by both the transmitter and the receiver coupled by a physical channel; means for determining a first plurality of transmission voltage levels varied in accordance with a sequence of voltage variations from a plurality of nominal voltage levels, where the sequence of voltage variations is based at least in part on the deterministic pseudo-random bit streams; means for detecting a second plurality of transmission voltage levels received through the physical channel representing a message, wherein the second plurality of transmission voltage levels include voltage levels varying from the plurality of nominal voltage levels; and means for authenticating the message by comparing the second plurality of transmission voltage levels for the message to the first plurality of transmission voltage levels varied in accordance with the sequence of voltage variations.

Example 32 may include the apparatus of example 31 and/or some other examples herein, wherein: the physical channel includes a first signal line and a second signal line; the means for determining the first plurality of transmission voltage levels include means for selecting a first transmission voltage level of the first plurality of transmission voltage levels from a first set of varied voltage levels varied from a first nominal voltage level for the first signal line, and a second transmission voltage level of the first plurality of transmission voltage levels from a second set of varied voltage levels varied from a second nominal voltage level for the second signal line to represent a digital 0 of the message; and means for selecting a third transmission voltage level of the first plurality of transmission voltage levels from a third set of varied voltage levels varied from a third nominal voltage level for the first signal line, and a fourth transmission voltage level of the first plurality of transmission voltage levels selected from a fourth set of varied voltage levels varied from a fourth nominal voltage level for the second signal line to represent a digital 1 of the message.

Example 33 may include the apparatus of any one of examples 31-32 and/or some other examples herein, wherein: the first nominal voltage level on the first signal line together with the second nominal voltage level on the second signal line represents a digital 0 of the message, the first set of varied voltage levels spans a first voltage interval that includes the first nominal voltage, and the second set of varied voltage levels spans a second voltage interval that includes the second nominal voltage; the third nominal voltage level on the first signal line together with the fourth nominal voltage on the second signal line represents a digital 1 of the message, the third set of varied voltages spans a third interval that includes the third nominal voltage, and the fourth set of voltage levels spans a fourth voltage interval that includes the fourth nominal voltage.

Example 34 may include the apparatus of any one of examples 31-32 and/or some other examples herein, wherein: the first set of varied voltage levels includes multiple voltage levels, wherein any two adjacent voltage levels of the first set of varied voltage levels has an equal distance equals to a first predetermined voltage level gap; the second set of varied voltage levels includes multiple voltage levels, wherein any two adjacent voltage levels of the second set of varied voltage levels has an equal distance equals to a second predetermined voltage level gap; the third set of varied voltage levels includes multiple voltage levels, wherein any two adjacent voltage levels of the third set of varied voltage levels has an equal distance equals to a third predetermined voltage level gap; or the fourth set of varied voltage levels includes multiple voltage levels, wherein any two adjacent voltage levels of the fourth set of varied voltage levels has an equal distance equals to a fourth predetermined voltage level gap.

Example 35 may include the apparatus of any one of examples 31-32 and/or some other examples herein, wherein the digital 0 and the digital 1 of the message are a first digital 0 and a first digital 1 of the message, and the means for determining the first plurality of transmission voltage levels further include: means for selecting a fifth transmission voltage level from the first set of varied voltage levels for the first signal line and a sixth transmission voltage level from the second set of varied voltage levels for the second signal line to represent a second digital 0 of the message, and means for selecting a seventh transmission voltage level from the third set of varied voltage levels for the first signal line and an eighth transmission voltage level from the fourth set of varied voltage levels for the second signal line to represent a second digital 1 of message.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

What is claimed is:

1. An apparatus for communication, comprising:
   a transmitter to transmit a message to a receiver via a physical channel coupling the transmitter and the receiver, and via a plurality of transmission voltage levels varied from a plurality of nominal voltage levels on the physical channel, wherein the transmitter includes:
   a voltage generator to generate the plurality of transmission voltage levels varied in accordance with a sequence of voltage variations from the plurality of nominal voltage levels for the message, wherein the sequence of voltage variations is based at least in part on a deterministic pseudo-random bit stream generated based on a common seed in possession by both the transmitter and the receiver to authenticate the message.

2. The apparatus of claim 1, wherein:
   the physical channel includes a first signal line and a second signal line;
   the voltage generator is coupled to the first signal line and the second signal line;
   the voltage generator is to select a first transmission voltage level of the plurality of transmission voltage levels from a first set of varied voltage levels varied from a first nominal voltage level for the first signal line, and a second transmission voltage level of the plurality of transmission voltage levels from a second set of varied voltage levels varied from a second nominal voltage level for the second signal line to represent a digital 0 of the message; and
   the voltage generator is to select a third transmission voltage level of the plurality of transmission voltage levels from a third set of varied voltage levels varied from a third nominal voltage level for the first signal line, and a fourth transmission voltage level of the plurality of transmission voltage levels selected from a fourth set of varied voltage levels varied from a fourth nominal voltage level for the second signal line to represent a digital 1 of the message.

3. The apparatus of claim 1, wherein the transmitter further includes:
   a pseudo-random number generator coupled to the voltage generator to generate the deterministic pseudo-random bit stream based on the common seed in possession by both the transmitter and the receiver.

4. The apparatus of claim 2, wherein the voltage generator selects the first transmission voltage level from the first set of varied voltage levels based on a first pseudo-random number, and the voltage generator selects the second transmission voltage level from the second set of varied voltage levels based on a second pseudo-random number.

5. The apparatus of claim 2, wherein:
   the first nominal voltage level on the first signal line together with the second nominal voltage level on the second signal line represents a digital 0 of the message, the first set of varied voltage levels spans a first voltage interval that includes the first nominal voltage level, and the second set of varied voltage levels spans a second voltage interval that includes the second nominal voltage level;
   the third nominal voltage level on the first signal line together with the fourth nominal voltage level on the second signal line represents a digital 1 of the message, the third set of varied voltage levels spans a third voltage interval that includes the third nominal voltage level, and the fourth set of varied voltage levels spans a fourth voltage interval that includes the fourth nominal voltage level.

6. The apparatus of claim 5, wherein the first nominal voltage level is 3.5 voltage (v), the second nominal voltage level is 1.5 v, the first voltage interval is [2.75 v, 4.5 v], and the second voltage interval is [0.5 v, 2.25 v];
   the third nominal voltage level is 2.5 v, the fourth nominal voltage level is 2.5 v, the third voltage interval is [1.5 v, 3 v], and the fourth voltage interval is [1.5 v, 3 v].

7. The apparatus of claim 2, wherein:
   the first set of varied voltage levels includes multiple voltage levels, wherein any two adjacent voltage levels of the first set of varied voltage levels have a distance equal to a first predetermined voltage level gap;
   the second set of varied voltage levels includes multiple voltage levels, wherein any two adjacent voltage levels of the second set of varied voltage levels have distance equal to a second predetermined voltage level gap;
   the third set of varied voltage levels includes multiple voltage levels, wherein any two adjacent voltage levels of the third set of varied voltage levels have a distance equal to a third predetermined voltage level gap; or
   the fourth set of varied voltage levels includes multiple voltage levels, wherein any two adjacent voltage levels of the fourth set of varied voltage levels have a distance equal to a fourth predetermined voltage level gap.

8. The apparatus of claim 7, wherein the first predetermined voltage level gap is different from the third predetermined voltage level gap.

9. The apparatus of claim 7, wherein the first predetermined voltage level gap is 0.05 v, and the third predetermined voltage level gap is 0.018 v.

10. The apparatus of claim 7, wherein the first predetermined voltage level gap is equal to the second predetermined voltage level gap, or the third predetermined voltage level gap is equal to the fourth predetermined voltage level gap.

11. The apparatus of claim 2, wherein the digital 0 and the digital 1 of the message are a first digital 0 and a first digital 1 of the message, and
   the voltage generator is to select a fifth transmission voltage level from the first set of varied voltage levels for the first signal line and a sixth transmission voltage level from the second set of varied voltage levels for the second signal line to represent a second digital 0 of the message, and the voltage generator is to select a seventh transmission voltage level from the third set of varied voltage levels for the first signal line and an eighth transmission voltage level from the fourth set of varied voltage levels for the second signal line to represent a second digital 1 of the message.

12. The apparatus of claim 11, wherein:
the first transmission voltage level is different from the fifth transmission voltage level,
the second transmission voltage level is different from the sixth transmission voltage level,
the third transmission voltage level is different from the seventh transmission voltage level, or
the fourth transmission voltage level is different from the eighth transmission voltage level.

13. The apparatus of claim 1, wherein the apparatus is an electronic control unit (ECU) or a gateway, and the physical channel is a part of a Controller Area Network (CAN) bus.

14. An apparatus for communication, comprising:
a receiver to receive a message from a transmitter via a physical channel coupling the transmitter and the receiver, and via a plurality of transmission voltage levels varied from a plurality of nominal voltage levels on the physical channel; and
a voltage detector to authenticate the message by determining the plurality of transmission voltage levels varied in accordance with a sequence of voltage variations from the plurality of nominal voltage levels for the message, wherein the sequence of voltage variations is based at least in part on a deterministic pseudo-random bit stream generated based on a common seed in possession by both the transmitter and the receiver.

15. The apparatus of claim 14, wherein:
the physical channel includes a first signal line and a second signal line;
the voltage detector is coupled to the first signal line and the second signal line;
the voltage detector is to determine a first transmission voltage level of the plurality of transmission voltage levels to be selected from a first set of varied voltage levels varied from a first nominal voltage level for the first signal line, and a second transmission voltage level of the plurality of transmission voltage levels to be selected from a second set of varied voltage levels varied from a second nominal voltage level for the second signal line to represent a digital 0 of the message; and
the voltage detector is to determine a third transmission voltage level of the plurality of transmission voltage levels to be selected from a third set of varied voltage levels varied from a third nominal voltage level for the first signal line, and a fourth transmission voltage level of the plurality of transmission voltage levels to be selected from a fourth set of varied voltage levels varied from a fourth nominal voltage level for the second signal line to represent a digital 1 of the message.

16. The apparatus of claim 14, wherein the receiver further includes:
a pseudo-random number generator coupled to the voltage detector to generate the deterministic pseudo-random bit stream based on the common seed in possession by both the transmitter and the receiver.

17. The apparatus of claim 15, wherein the voltage detector determines the first transmission voltage level to be selected from the first set of varied voltage levels based on a first pseudo-random number, and the voltage detector determines the second transmission voltage level to be selected from the second set of varied voltage levels based on a second pseudo-random number.

18. The apparatus of claim 15, wherein:
the first nominal voltage level on the first signal line together with the second nominal voltage level on the second signal line represents a digital 0 of the message, the first set of varied voltage levels spans a first voltage interval that includes the first nominal voltage level, and the second set of varied voltage levels spans a second voltage interval that includes the second nominal voltage level;
the third nominal voltage level on the first signal line together with the fourth nominal voltage level on the second signal line represents a digital 1 of the message, the third set of varied voltage levels spans a third voltage interval that includes the third nominal voltage level, and the fourth set of varied voltage levels spans a fourth voltage interval that includes the fourth nominal voltage level.

19. The apparatus of claim 15, wherein:
the first set of varied voltage levels includes multiple voltage levels, wherein any two adjacent voltage levels of the first set of varied voltage levels have a distance equal to a first predetermined voltage level gap;
the second set of varied voltage levels includes multiple voltage levels, wherein any two adjacent voltage levels of the second set of varied voltage levels have a distance equal to a second predetermined voltage level gap;
the third set of varied voltage levels includes multiple voltage levels, wherein any two adjacent voltage levels of the third set of varied voltage levels have a distance equal to a third predetermined voltage level gap; or
the fourth set of varied voltage levels includes multiple voltage levels, wherein any two adjacent voltage levels of the fourth set of varied voltage levels have a distance equal to a fourth predetermined voltage level gap.

20. The apparatus of claim 19, wherein the first predetermined voltage level gap is different from the third predetermined voltage level gap.

21. The apparatus of claim 19, wherein the first predetermined voltage level gap is equal to the second predetermined voltage level gap, or the third predetermined voltage level gap is equal to the fourth predetermined voltage level gap.

22. The apparatus of claim 14, wherein the apparatus is an electronic control unit (ECU) or a gateway, and the physical channel is a part of a Controller Area Network (CAN) bus.

23. A method for authenticating a message between a transmitter and a receiver, comprising:
generating a message by the transmitter to be transmitted to the receiver through a physical channel coupling the transmitter and the receiver;
generating deterministic pseudo-random bit streams based on a common seed in possession by both the transmitter and the receiver;
generating a plurality of transmission voltage levels for the message, wherein the plurality of transmission voltage levels include voltage levels varying in accordance with a sequence of voltage variations from a plurality of nominal voltage levels, the sequence of voltage variations is based at least in part on the deterministic pseudo-random bit streams to authenticate the message; and transmitting the plurality of transmission voltage levels over the physical channel to the receiver.

24. The method of claim 23, wherein:

the physical channel includes a first signal line and a second signal line; and the generating the plurality of transmission voltage levels includes:

selecting a first transmission voltage level of the plurality of transmission voltage levels from a first set of varied voltage levels varied from a first nominal voltage level for the first signal line, and a second transmission voltage level of the plurality of transmission voltage levels from a second set of varied voltage levels varied from a second nominal voltage level for the second signal line to represent a digital 0 of the message; and selecting a third transmission voltage level of the plurality of transmission voltage levels from a third set of varied voltage levels varied from a third nominal voltage level for the first signal line, and a fourth transmission voltage level of the plurality of transmission voltage levels selected from a fourth set of varied voltage levels varied from a fourth nominal voltage level for the second signal line to represent a digital 1 of the message.

25. The method of claim 24, wherein:

the first nominal voltage level on the first signal line together with the second nominal voltage level on the second signal line represents a digital 0 of the message, the first set of varied voltage levels spans a first voltage interval that includes the first nominal voltage level, and the second set of varied voltage levels spans a second voltage interval that includes the second nominal voltage level;

the third nominal voltage level on the first signal line together with the fourth nominal voltage level on the second signal line represents a digital 1 of the message, the third set of varied voltage levels spans a third voltage interval that includes the third nominal voltage level, and the fourth set of varied voltage levels spans a fourth voltage interval that includes the fourth nominal voltage level.

* * * * *